SEARCH TUNING APPARATUS FOR AM, FM AND FM STEREO
Filed May 24, 1965
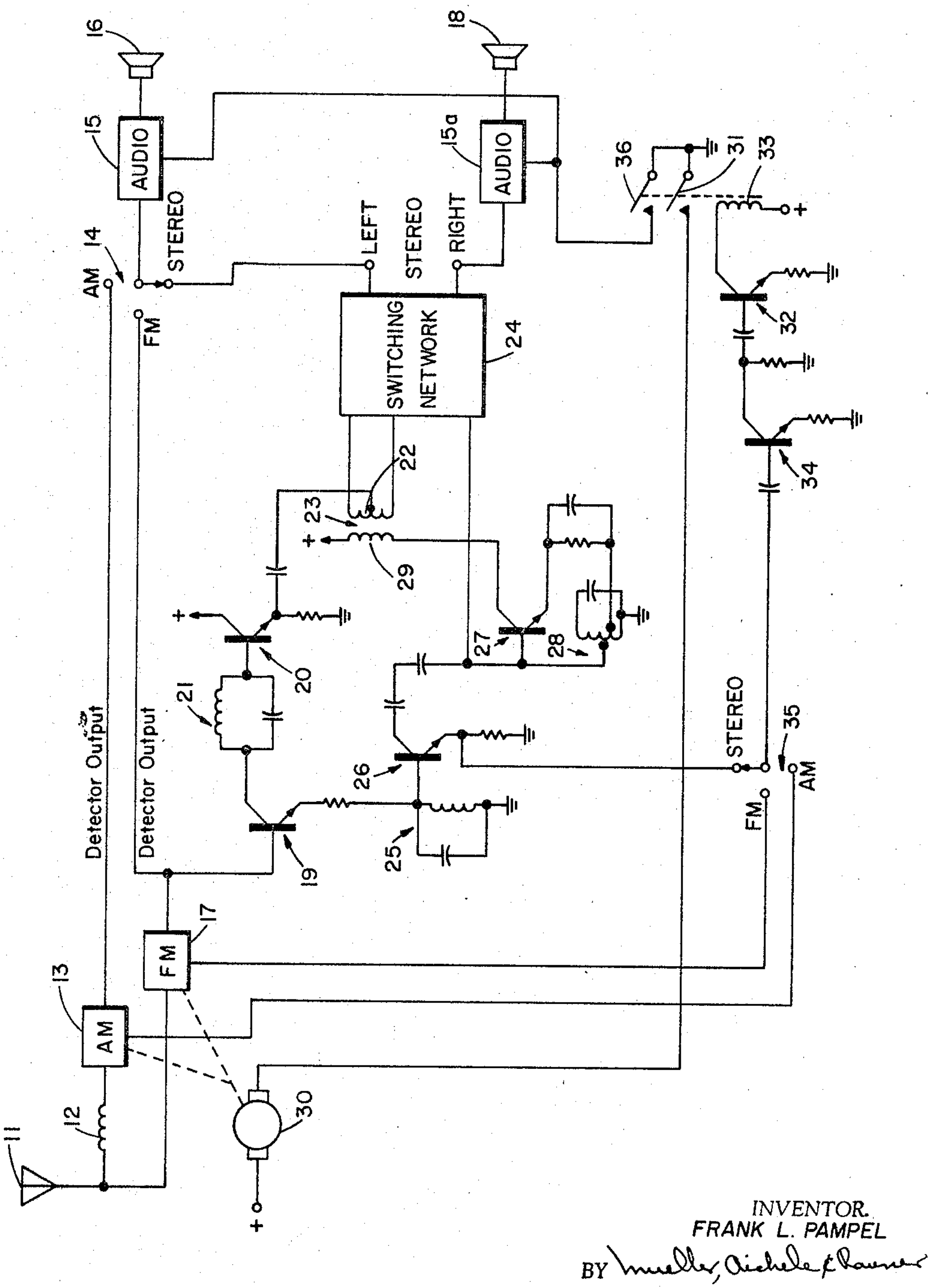
INVENTOR.
FRANK L. PAMPEL
BY Mueller, Aichele & Rauner
ATTYS.

United States Patent Office 3,334,187

Patented Aug. 1, 1967

3,334,187

SEARCH TUNING APPARATUS FOR AM, FM AND FM STEREO

Frank L. Pampel, Elgin, Ill., assignor to Motorola, Inc., Franklin Park, Ill., a corporation of Illinois Filed May 24, 1965, Ser. No. 457,949
2 Claims. (Cl. 179—15)

ABSTRACT OF THE DISCLOSURE

This electronic apparatus includes a radio broadcast receiver which has a search motor connected to the receiver tuner to vary the tuned frequency thereof. A four terminal switch is connected to a two stage semiconductor switch. The semiconductor switch is responsive to signals from an AM broadcast station and an FM broadcast station which are selectively coupled through the four terminal switch to de-energize the search motor. In addition, the pilot signal in the transmitted multiplex signal from an FM stereo station may also be coupled by the four terminal switch to the semiconductor switch to de-energize the search motor.

This invention relates to radios having search tuners, and more particularly to an AM–FM search radio having provision for selecting only stations which transmit stereo FM signals.

A search radio is a radio receiver which has a tuner with provision for automatically searching across the frequency band and selecting the frequency of a transmitting station. Such a broadcast receiver is of particular advantage in vehicle broadcast receivers as it provides selection of broadcasting stations with a minimum distraction to the driver of the vehicle, for greater safety. It may be desired that a vehicle radio broadcast receiver be capable or receiving both amplitude modulation (AM) and frequency modulation (FM) broadcasts. The frequency modulation portion of the receiver may also be capable of receiving and reproducing stereophonic signals, and it may be desired that the search radio seek out only those stations transmitting stereophonic signals.

It is an object of this invention to provide a combination AM–FM radio broadcast receiver having an improved search tuning system.

Another object of the invention is to provide a search tuning system for a frequency modulation receiver, which system selects only stations broadcasting stereophonic programs.

A feature of the invention is the provision, in a broadcast receiver search tuning system, of a switch operable to selectively de-energize a search motor on AM stations only, on FM stations only, and on FM stereo stations only, in response to reception of AM, FM and FM stereo signals respectively.

Another feature of the invention is the provision, in a search radio, of a switch operable to connect signals from the suppressed subcarrier detector portion of the stereo receiver circuit to the control circuit for the search motor to stop the search motor on frequency modulation stereo stations only.

Still another feature is the provision of a radio having a mute device responsive to detection of suppressed subcarrier signals by the subcarrier detector portion to enable the audio portion of the receiver.

The drawing is a schematic diagram, partially in black form, of a combination AM/FM radio broadcast receiver including a search system in accordance with the invention.

The invention as shown comprises a combination AM/FM radio broadcast receiver having a search motor connected to the tuner of the receiver and energizable to vary the frequency to which the receiver is tuned. A control circuit is connected to the search motor and is responsive to signals applied thereto to de-energize the search motor. A switch has a first terminal connected to the control circuit and has second, third and fourth terminals. The AM portion of the receiver is connected to the second terminal to supply signals thereto when the receiver is tuned to an AM broadcast station. The FM portion of the receiver is connected to the third terminal and supplies signals thereto when the receiver is tuned to an FM broadcast station. The receiver further includes a demultiplexing circuit for deriving stereophonic signals from received multiplex signals when the receiver is tuned to a frequency modulation stereo broadcast station. The demultiplexing circuit includes a detector which detects suppressed subcarrier signals of received multiplex signals. This detector is connected to the fourth terminal for applying detected signals thereto. The switch is operable to selectively connect the first terminal to the second, third and fourth terminals for applying signals to the control circuit for de-energization of the search motor selectively in response to reception of signals from AM, FM and FM stereo broadcast stations, respectively.

Referring now to the drawing, when the receiver is operating in AM mode, AM broadcast signals received by antenna 11 are coupled through filter 12 to AM receiver portion 13 of the combination AM/FM radio broadcast receiver. The output of receiver portion 13, in the form of detected audio frequency signals, is applied through a switch 14 to audio frequency amplifier 15. Such signals are then reproduced in speaker 16.

When the receiver is operating in FM mode, FM signals received by antenna 11 are applied to FM receiver portion 17 and from there through switch 14 and audio amplifier 15 to speaker 16. Switch 14 is movable to its respective AM, FM and FM STEREO terminals according to the type of reception desired.

With switch 14 moved to connect audio amplifier 15 to the FM STEREO terminal, the receiver will reproduce stereo signals in speakers 16 and 18. Known broadcast techniques involve multiplexing the right and left channel audio signals together with suppressed subcarrier or pilot signals. The detector of receiver portion 17 derives such signals from the intermediate frequency signals as is well known in the art. When switch 14 is in the STEREO position, the output of the detector of portion 17 is appied to the base of the transistor amplifier 19 in a demultiplexing circuit. The output of transistor 19 is applied to the base of transistor amplifier 20 through a trap 21 which may be utilized to block additional information signals included in the multiplex circuit output of the detector of receiver portion 17. Transistor 20 has an emitter electrode coupled to the center tap of the secondary winding 22 of a transformer 23. Secondary winding 22 is connected at each end of a switching network 24. Switching network 24 is the switching demodulator type well known in the art. An example of such a circuit is shown in the magazine Electronics World, January 1962, in an article by Norman H. Crowhurst entitled "FM Multiplex Stereo Detection Methods." In addition to deriving the right and left channel audio signals from multiplex signals applied thereto, the switching network 24 will also pass non-multiplex audio signals. The output of switching network 24 is applied to audio circuits 15 and 15*a* to drive speakers 16 and 18.

As is well known in the art, in order for switching network 24 to derive the right and left channel components from the multiplex signal applied thereto, the 38 kc. carrier signal (suppressed at the transmitter) is restored in the receiver and applied to the switching network through transformer 23. To facilitate the restoration of the suppressed carrier signals in proper phase with the composite multiplex signals, a 19 kc. pilot signal is transmitted. This 19 kc. pilot signal is detected by a detector comprised of tuned circuit 25 and transistor 26. The output of transistor 26 is coupled to the base of transistor 27. Transistor 27 is coupled to a feedback circuit including tuned circuit 28, which is tuned to 38 kc. or the second harmonic of the 19 kc. output of transistor 26. Accordingly, transistor 27 will provide oscillations at the 38 kc. frequency of the suppressed carrier in proper phase, which signals are supplied to the primary winding 29 of transformer 23 and from there through the secondary winding 22 to switching network 24.

The search tuner system of the invention includes a search motor 30, energizable through a switch 31 to drive tuning elements of the AM receiver portion 13 and tuning elements of FM receiver portion 17 (not shown), as is well known in the art. Switch 31 is formed by a relay contact which is normally open and is closed by conduction of amplified current through relay winding 33. The amplifier comprises a transistor 34 connected in cascade fashion with a transistor 32. When transistor 34 is rendered conductive, it will be seen that transistor 32 is biased to cut off. This will open switch 31 because of the deenergization of winding 33, and hence the search motor will stop.

Signals are applied to the base of transistor 34 for rendering the same conductive through a switch 35. When switch 35 is in the AM position, signals from AM receiver portion 13 are coupled to the base of transistor 34. The AM terminal on switch 35 might, for example, be connected to the intermediate frequency amplifier in the AM portion 13 of the receiver such as is shown in the patent to Hill, No. 2,974,225 and assigned to the assignee of the present invention. Under such circumstances, when the tuner is driven to a position where an AM signal is being received, a signal will be applied through switch 35 to the base of transistor 34 biasing such transistor into conduction. This will cut off transistor to deenergize relay 33 and open switch 31 to cause the search motor 30 to stop at the AM broadcast station to which the receiver is tuned.

Similarly, the FM terminal of switch 35 is connected to the FM portion 17 of the receiver. For example, the FM terminal might be connected to the intermediate frequency amplifier of the receiver portion 17 as shown in the Hill patent, or to the FM detector. Thus, when the tuner is driven to a position where a signal from a frequency modulation broadcast station is being received, signals will be applied to the base of transistor 34 to stop search motor 30.

The STEREO terminal of switch 35 is connected to the emitter of transistor 26. Transistor 26 will produce detected 19 Kc. suppressed subcarrier signals at its emitter, as previously explained, when FM stereo signals are being received. Thus with switch 35 connecting the STEREO terminal to the base of transistor 34, reception of stereo signals by the FM receiver portion 17 will render transistor 34 conducting. This will cut off transistor 32 and release relay 33 to open switch 31 and cause search motor 30 to stop at that FM stereo broadcast station. If stereo signals are not being received, no signal will appear at the emitter of transistor 26 and hence the search motor will continue its rotation.

With switches 14 and 35 ganged for simultaneous operation to connect the appropriate AM, FM and FM STEREO terminals, it will be seen that selection is provided for searching AM stations only, FM stations only and FM stereo stations only. It is possible to provide an extra contact 36 on relay 33, ganged with the switch 31 and connected to the audio circuits 15 and 15*a*, in order to mute the audio circuit when the motor is searching and to enable the audio circuit when the receiver is tuned to a desired station. Switch 36 permits manual operation of the receiver tuning mechanism to AM, FM or FM stereo stations only by muting all other stations. Muting may be accomplished by any of a number of ways known in the art, such as by shunting the audio output or shunting the operating bias for an audio amplifier stage.

It will therefore be seen that the invention provides an improved combination AM/FM radio broadcast receiver having a search system which will search out, selectively, AM, FM or FM stereo stations only.

I claim:

1. A radio broadcast receiver including in combination, a search motor connected to the tuner of the receiver and energizable to vary the frequency to which the receiver is tuned, a control circuit connected to said search motor and responsive to signals applied thereto to de-energize said search motor, a switch having first, second, third and fourth terminals, said first terminal being connected to said control circuit, said receiver having an AM portion connected to said second terminal and supplying signals thereto when the receiver is tuned to an AM broadcast station, said receiver having a FM portion connected to said third terminal and supplying signals thereto when the receiver is tuned to a FM broadcast station, said receiver including a demultiplexing circuit for deriving stereophonic signals from received multiplex signals including a pilot signal when said receiver is tuned to a FM stereo broadcast station, said demultiplexing circuit including detector means for detecting said pilot signals of received multiplex signals, and means connecting said detector means to said fourth terminal for applying said detected pilot signals thereto, said switch being operable to selectively connect said first terminal to said second, third and fourth terminals for applying signals to said control circuit for de-energization of said search motor selectively at only AM stations, at only FM stations, and at only FM stereo broadcast stations, respectively.

2. A radio broadcast receiver having an audio output and including in combination, a search motor connected to the tuner of the receiver and energizable to vary the frequency to which the receiver is tuned, a two stage semiconductor switch responsive to signals applied thereto to supply an output, a relay connected to said semiconductor switch and energizable by an output supplied by said second stage to de-energize said search motor, muting means for the audio output of the receiver, said muting means being responsive to energization of said relay to de-mute the receiver, a switch having first, second, third and fourth terminals, said first terminal being connected to said first stage of said semiconductor switch, said receiver having an AM portion connected to said second terminal and supplying signals thereto when the receiver is tuned to an AM broadcast station, said receiver having a FM portion connected to said third terminal and supplying signals thereto when the receiver is tuned to a FM broadcast station, said receiver including a demultiplexing circuit for deriving stereophonic signals from received multiplex signals including a pilot signal when said receiver is tuned to a FM stereo broadcast station, said demultiplexing circuit including detector means for detecting said pilot signals, and means connecting said detector means to said fourth terminal for applying said pilot signals thereto, said switch being operable to selectively connect said first terminal to said second, third and fourth terminals for applying signals to said first stage of said semiconductor switch for operating said second stage to de-energize said search motor selectively at only AM stations, at only FM stations, and at only FM stereo broadcast stations, respectively.

References Cited

UNITED STATES PATENTS

| | | | |
|---|---|---|---|
| 2,666,853 | 1/1954 | O'Brien | 325—470 |
| 3,043,914 | 7/1962 | Collins | 179—15 |
| 3,192,339 | 6/1965 | Carlson | 179—15 |
| 3,248,484 | 4/1966 | Beckman | 179—15 |

JOHN W. CALDWELL, *Acting Primary Examiner.*

ROBERT L. GRIFFIN, *Examiner.*